United States Patent Office 3,167,816
Patented Feb. 2, 1965

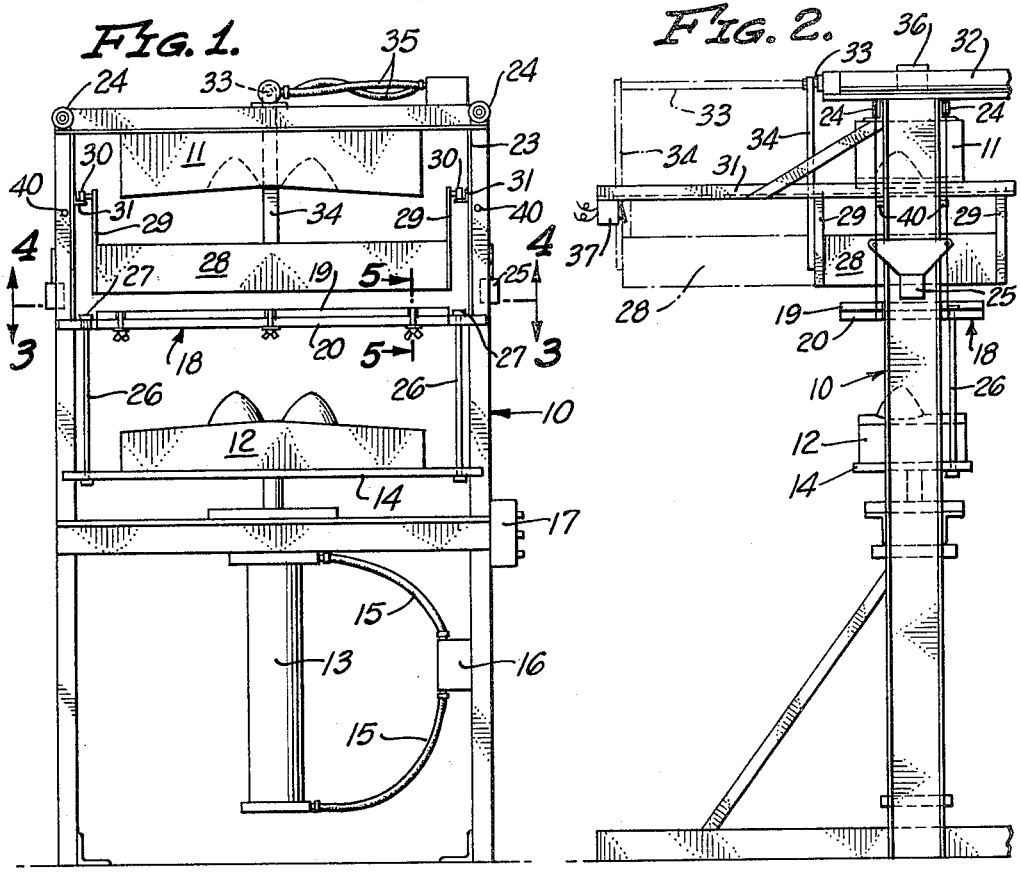
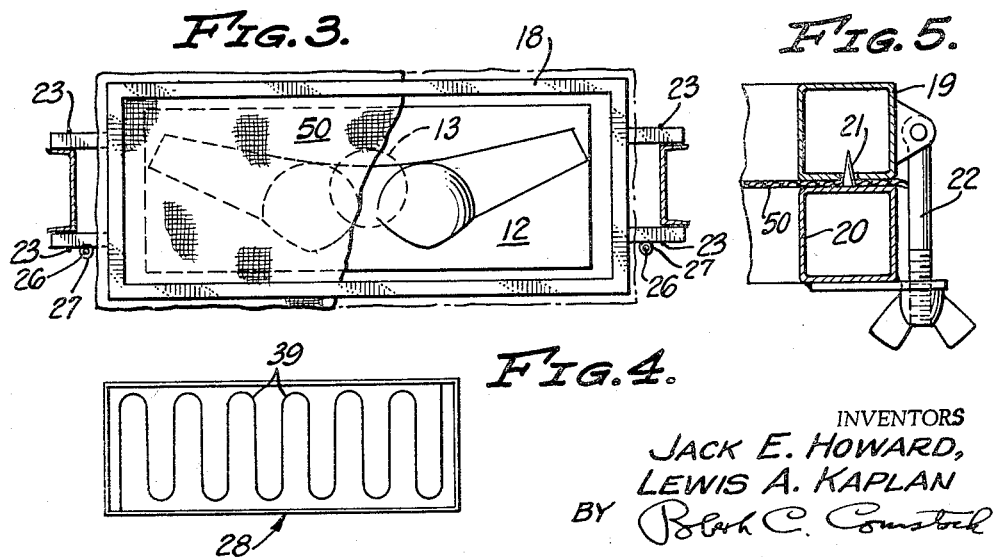

3,167,816
APPARATUS FOR MAKING BRASSIERES
AND OTHER GARMENTS
Jack E. Howard and Lewis A. Kaplan, Los Angeles, Calif., assignors to International Fabric Molders, Inc., Los Angeles, Calif., a corporation of California
Filed Nov. 30, 1961, Ser. No. 156,021
4 Claims. (Cl. 18—19)

This invention relates to an apparatus for making brassieres and other garments from thermoplastic material.

It is an object of our invention to provide such an apparatus which is particularly adapted for use in working with thermoplastic fabrics or materials which are not adaptable for use with heated molds. Many types of thermoplastic materials will melt when they come in contact with a heated mold or are otherwise incapable of or unsuitable for use with heated molds.

It is accordingly an object of our invention to provide an apparatus in which a sheet of thermoplastic material is heated and, while heated, it is formed into the desired shape by complementarily formed male and female molds.

Because such thermoplastic materials quickly lose their heat, it is another object of our invention to provide such an apparatus in which a minimum amount of time elapses between the cessation of the heating and the subjection of the material to the molding operation.

A further object of our invention is to provide such an apparatus in which certain portions of the thermoplastic material are contacted by the unheated male mold before the remainder of the sheet is contacted. The portions which are first contacted are thus cooled by their contact with the male mold to avoid undesirable stretching of these portions, since they will not stretch after they have been cooled.

Another object of our invention is to provide such an apparatus which is capable of being used to mold a plurality of layers of thermoplastic material at the same time.

It is also among the objects of our invention to provide an apparatus of the type described which is simple in construction and operation and which are capable of being economically operated as to time, labor and material.

It is accordingly among the objects of our invention to provide an apparatus having all of the advantages and benefits set forth above and in further detail hereafter in this specification.

Our invention also comprises such other objects, advantages as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings, FIG. 1 is front elevational view of a device constructed in accordance with our invention;

FIG. 2 is a side elevational view of the same, partly broken, with the retracted position of the heater rack shown in phantom lines;

FIG. 3 is a sectional view of the same, taken on line 3—3 of FIG. 1;

FIG. 4 is a sectional view of the same, taken on line 4—4 of FIG. 1;

FIG. 5 is a sectional view of the same, taken on line 5—5 of FIG. 1;

Figure 6:
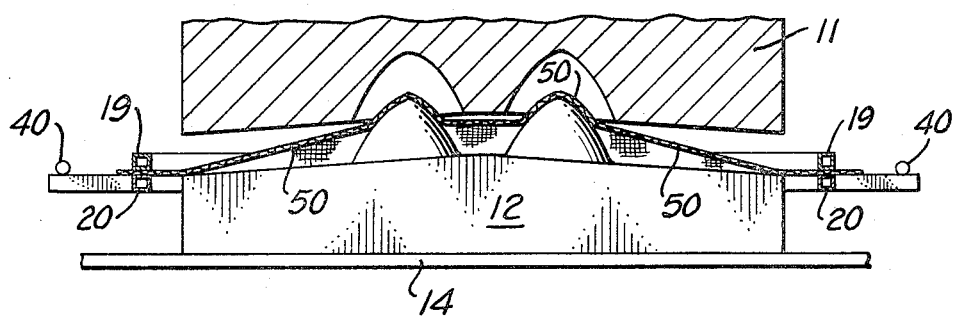
FIG. 6 is a front elevational view of the molds, partly in section, showing the molds in partially closed position, with the uppermost portion of the male mold engaging the thermoplastic material.
Figure 7:
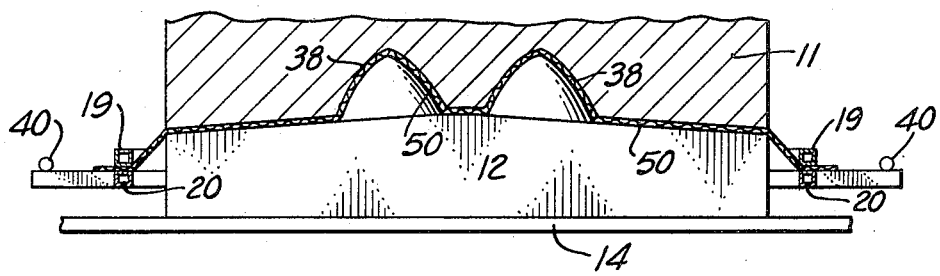
FIG. 7 is a view similar to FIG. 6, showing the molds in completely closed position with the thermoplastic material held between them.

A preferred embodiment which has been selected to illustrate our invention comprises a press 10, upon which are mounted a female mold 11 and a male mold 12. The female mold 11 is fixedly mounted adjacent the top of the press 10, while the male mold 12 is mounted adjacent the midportion of the press 10 and is capable of upward movement into engagement with the female mold 11.

Upward movement of the male mold 12 is accomplished by means of a hydraulic ram 13, which operates a piston which in turn moves a mounting plate 14 upon which the male mold 12 is mounted. The operation of the ram 13 is controlled by hydraulic fluid supplied through hoses 15, a solenoid valve 16, which is controlled from a control box 17.

An open rectangular frame 18 is mounted midway between the molds 11 and 12. The frame 18 comprises upper and lower sections 19 and 20 respectively. The lower section 20 is provided with a plurality of upwardly-directed pins 21 which extend through the thermoplastic material and through openings in the upper section 19 to hold a sheet of thermoplastic material 50 in a substantially taut condition stretched across the open frame 18. A plurality of clamps 22 hold the frame sections 19 and 20 together.

The frame 18 is held in position by a pair of cables 23, which are attached at one end to opposite sides of the frame 18. The cables 23 extend around pulleys 24 at the top of the press 10 and then extend downwardly, with their lower ends being connected to counterweights 25.

The counterweights 25 thus normally tend to move the frame 18 upwardly within the press 10. Upward movement of the frame 18 is limited, however, by a pair of vertically directed retaining rods 26, which are secured at their lower ends to the mounting plate 14 of the male mold 12. The upper ends of the rods 26 slidably extend through the sides of the frame 18. Collars 27 carried by the upper ends of the rods 26 engage the frame 18 to limit its upward movement when the mounting plate 14 is in downward position.

Mounted above the frame 18 is a heater rack 28, which carries heating coils 39 or other suitable means for heating the thermoplastic material 50 which is held on the frame 18. The heater rack 28 is supported by arms 29 from rollers 30, which move a pair of tracks 31. The tracks 31 extend rearwardly from the press 10 and are sufficiently long so that the heater rack 28 is capable of being moved horizontally between two positions. In its operating position, the heater rack 28 is disposed directly above the frame 18 between it and the female mold 11. In its non-operating position, the heater rack 28 is moved along the tracks 31 to a position in which it is completely clear of the frame 18 and molds 11 and 12, so that the molds 11 and 12 can be closed with the thermoplastic material 50 between them.

Movement of the heater rack 28 between its operating and non-operating positions is accomplished by means of a hydraulically operated piston 32, which reciprocally operates a rod 33, one end of which is attached to an arm 34 which is in turn attached to the heater rack 28. The piston 32 is operated by air or other hydraulic fluid supplied through hoses 35 from a solenoid valve 36.

An interlock micro-switch 37 is mounted at the end of one of the tracks 31 for engagement by the heater rack 28 to prevent upward movement of the male mold 12 before the heater rack 28 is in its non-operating position.

In use, a sheet of thermoplastic material 50 is stretched across the frame 18. The heater rack 28 is then moved to operating position and the heater coil 39 energized to heat the thermoplastic material 50. When the material has been sufficiently heated, the piston 32 is operated to withdraw the heater rack 28. As soon as the heater rack 28 reaches its retracted position, the hydraulic ram 13 is operated to move the mounting plate 14 and male mold 12 upwardly toward the female mold 11. As the male mold 12 moves upwardly, the frame 18 is moved upwardly simultaneously by the counterweights 25.

Both the male mold 12 and the frame 18 continue to move upwardly together until the frame 18 engages a pair of stop members 40 which are mounted on the sides of the press 10. The stop members 40 prevent further upward movement of the frame 18, while the male mold 12 continues to move upwardly.

As best shown in FIG. 6 of the drawings, the uppermost portions of the male mold 12 will engage the thermoplastic material 50 while the remainder of the thermoplastic material is untouched by either of the molds. The portions of the thermoplastic material 50 which are engaged by the male mold 12 are quickly cooled, to prevent them from being overly stretched.

The male mold 12 then moves to its uppermost position, engaging the female mold 11, with the thermoplastic material 50 held between them. The thremoplastic material 50 is held between the molds 11 and 12 and permanently assumes the contour thereof. The stretching of the thermoplastic material 50 to form the breast cups 38 takes place principally in areas other than the breast cups 38.

Because the thermoplastic material 50 cools quickly, the entire operation must be performed rapidly and is preferably accomplished within a small number of seconds. In case the molds 11 and 12 become heated from contact with the heated thermoplastic material 50, cooling ducts may be provided for circulating coolant through the molds 11 and 12.

In case the material 50 is thick or a large number of layers are to be heated at the same time, a second heater rack 28 could be provided beneath the frame 18 in order to heat the material 50 from both sides simultaneously.

The operation of the device is preferably coordinated so as to be either automatic or semi-automatic in operation. Proper heating of the thermoplastic material may be assured by use of a thermocouple which would in turn trigger the operation of the heater rack and closing of the molds as soon as the material reaches the desired temperature.

The means used to close the molds need not necessarily be hydraulic. Any suitable mechanical or electromechanical means may also be employed. The method of moving the molds and frame with respect to each other may also be varied, as long as their relative movement results in the projecting portions of the male mold contacting the material first.

We claim:

1. An apparatus for making a brassiere part or the like from flat thermoplastic sheet material which is unsuitable for use in hot molds comprising a hydraulic ram, a mounting plate mounted above said ram, a male mold mounted on said mounting plate, said male mold having portions projecting vertically above the remainder thereof, said mounting plate and male mold adapted to be reciprocated vertically upon the operation of said ram, a frame mounted above said male mold, pin means adjacent the periphery of said frame for holding a sheet of flat thermoplastic sheet material on said frame, said ram normally maintaining said male mold in lowered position, counterweight means connected to said frame and normally urging said frame upwardly, rod means slidably connecting said frame to said mounting plate whereby said frame is restricted from upward movement while said mounting plate is in lowered position and until said mounting plate is moved upwardly by said ram, a pair of tracks extending laterally away from said frame, a heater rack slidably mounted on said tracks, means for moving said heater rack to two positions, in one of which said rack is adjacent and parallel to said frame and in the other of which it is moved laterally away from said frame, a female mold formed complementarily to said male mold and fixedly mounted above said frame a sufficient distance to permit the lateral movement of said heater rack between said frame and said female mold, said heater rack adapted to heat the material on said frame and then be retracted to permit the movement of said male mold toward said female mold, said frame moving upwardly with said male mold, and stop means for limiting the upward movement of said frame, whereby the upwardly projecting portions of said male mold will contact portions of said material before the remainder of said material is contacted to cool said contacted portions and prevent undue stretching of said contacted portions.

2. An apparatus for making a brassiere part or the like from flat thermoplastic sheet material which is unsuitable for use in hot molds comprising a male mold having portions projecting vertically above the remainder thereof, said male mold being mounted for vertical reciprocal movement, a frame mounted above said male mold, pin means adjacent the periphery of said frame for holding a sheet of flat thermoplastic sheet material on said frame, means normally maintaining said male mold in lowered position, counterweight means connected to said frame and normally urging said frame upwardly, means connecting said frame to said mold whereby said frame is restricted from upward movement until said mold is moved upwardly, a pair of tracks extending laterally away from said frame, a heater rack slidably mounted on said tracks, means for moving said heater rack to two positions, in one of which said rack is adjacent and parallel to said frame and in the other of which it is moved laterally away from said frame, a female mold formed complementarily to said male mold and fixedly mounted above said frame a sufficient distance to permit the lateral movement of said heater rack between said frame and said female mold, said heater rack adapted to heat the material on said frame and then be retracted to permit the movement of said male mold toward said female mold, said frame moving upwardly with said male mold, and stop means for limiting the upward movement of said frame, whereby the upwardly projecting portions of said male mold will contact portions of said material before the remainder of said material is contacted to cool said first contacted portions and prevent undue stretching of said first contacted portions.

3. An apparatus for making a brassiere part or the like from flat thermoplastic sheet material which is unsuitable for use in hot molds comprising a male mold having portions projecting vertically above the remainder thereof, said male mold being mounted for vertical reciprocal movement, a frame mounted above said male mold, pin means adjacent the periphery of said frame for holding a sheet of flat thermoplastic sheet material on said frame, means normally maintaining said male mold in lowered position, counterweight means connected to said frame and normally urging said frame upwardly, means connecting said frame to said mold whereby said frame is restricted from upward movement until said mold is moved upwardly, a pair of tracks extending laterally away from said frame, a heater rack slidably mounted on said tracks, means for moving said heater rack to two positions, in one of which said rack is adjacent and parallel to said frame and in the other of which it is moved laterally away from said frame, a female mold formed complementarily to said male mold and fixedly mounted above said frame a sufficient distance to permit the lateral movement of said heater rack between said frame and said female mold, said heater rack adapted to heat the material on said frame and then be retracted to permit the movement of said male mold toward said female mold, said frame moving upwardly with said male mold.

4. An apparatus for making a brassiere part or the like from flat thermoplastic sheet material which is unsuitable for use in hot molds comprising a male mold mounted for vertical reciprocal movement, a frame mounted above said male mold, means adjacent the periphery of said frame for holding a sheet of flat thermoplastic sheet material on said frame, means normally maintaining said male mold in lowered position, means connecting said frame to said mold whereby said frame is restricted from upward movement until said mold is moved upwardly, a pair of tracks extending laterally away from said frame, a heater rack slidably mounted on said tracks, means for moving said heater rack to two positions, in one of which said rack is adjacent and parallel to said frame and in the other of which it is moved laterally away from said frame, a female mold formed complementarily to said male mold and fixedly mounted above said frame a sufficient distance to permit the lateral movement of said heater rack between said frame and said female mold, said heater rack adapted to heat the material on said frame and then be retracted to permit the movement of said male mold toward said female mold, said frame moving upwardly with said male mold, and stop means for limiting the upward movement of said frame so that the upwardly projecting portions of said male mold will contact portions of said material before the remainder of said material is contacted to cool said first contacted portions and prevent undue stretching of said first contacted portions.

References Cited by the Examiner
UNITED STATES PATENTS

| | | | |
|---|---|---|---|
| 2,580,566 | 1/52 | MacHenry | 18—19 |
| 2,804,644 | 9/57 | Kyle | 18—19 |
| 2,836,852 | 6/58 | Butzko | 18—19 |
| 2,858,567 | 11/58 | Shapero | 18—24 |
| 2,989,780 | 6/61 | Zimmerman | 18—19 |
| 3,019,488 | 2/62 | Doyle et al. | |
| 3,025,566 | 3/62 | Kostur | 18—19 |
| 3,058,154 | 10/62 | Howard et al. | 18—19 |
| 3,133,314 | 5/64 | Arnould et al. | 18—19 |

WILLIAM J. STEPHENSON, *Primary Examiner.*